(12) United States Patent
Tang

(10) Patent No.: US 6,907,168 B2
(45) Date of Patent: Jun. 14, 2005

(54) OPTICAL FIBER HAVING A LIGHT-EMITTING SEGMENT

(76) Inventor: Tai-Ning Tang, 581 Kamoku St. #3506, Honolulu, HI (US) 96826

(*) Notice: Subject to any disclaimer, the term of this patent is extended or adjusted under 35 U.S.C. 154(b) by 108 days.

(21) Appl. No.: 10/601,885

(22) Filed: Jun. 24, 2003

(65) Prior Publication Data

US 2004/0264852 A1 Dec. 30, 2004

(51) Int. Cl.$^7$ ............................. G02B 6/04; G02B 6/26; G02B 6/42
(52) U.S. Cl. ............................. 385/39; 385/15; 385/27; 385/28; 385/32; 385/115
(58) Field of Search ................................ 385/15, 27, 28, 385/30–32, 39, 115, 120, 14

(56) References Cited

U.S. PATENT DOCUMENTS

| | | | | |
|---|---|---|---|---|
| 4,473,270 A | * | 9/1984 | Shaw | 385/30 |
| 4,704,660 A | * | 11/1987 | Robbins | 362/552 |
| 4,752,114 A | * | 6/1988 | French | 385/115 |
| 4,977,487 A | * | 12/1990 | Okano | 362/555 |
| 5,187,765 A | * | 2/1993 | Muehlemann et al. | 385/115 |
| 5,357,122 A | * | 10/1994 | Okubora et al. | 257/84 |
| 5,398,170 A | * | 3/1995 | Lee | 362/559 |
| 5,495,400 A | * | 2/1996 | Currie | 362/551 |
| 5,771,321 A | * | 6/1998 | Stern | 385/31 |
| 5,816,883 A | * | 10/1998 | Holland | 446/219 |
| 6,104,371 A | * | 8/2000 | Wang et al. | 345/102 |
| 6,234,657 B1 | * | 5/2001 | Shih | 362/559 |
| 6,477,284 B1 | * | 11/2002 | Oda et al. | 385/14 |
| 6,625,349 B2 | * | 9/2003 | Zhao et al. | 385/30 |
| 2002/0076150 A1 | * | 6/2002 | Zhao et al. | 385/30 |
| 2002/0150320 A1 | * | 10/2002 | Kato | 385/14 |
| 2002/0172464 A1 | * | 11/2002 | Delwala | 385/40 |

OTHER PUBLICATIONS

Weber, Austin, "Assembly Innovations: How Fiber Optics Works", http://www.assemblymag.com/CDA/ArticleInformation/features/BNP__Features__Item/0,6493,100554,00.html.*
Newport Tutorial, "Fiber Basics", http://www.newport.com/store/xq/Asp/lone.Photoincs/lang.1/Itwo.Optical+Fibers+and+Accessories/Ithree.Tutorial/id.2922/qx/pro.duct.htm.*
Ripin et al., "High effieciency side–coupling of light into optical fibres using embedded v–grooves", Abstract, IEEE 31/25 (1995) 2204–2205.*
Li et al., "Inexpensive Local Interconnect Solutions Using Side–coupling Polymer Optical Fibers", 4th International Conf. Massively Parallel processing Using Optical Interconnections, Jun. 1997, Montreal, Canada, p. 45.*
Li et al., "Low–cost Guided–wave Interconnections Using Side–coupling Polymer Optical Fibers", http://ipdps.eece.unm.edu/1997/wocs/li.pdf.*

* cited by examiner

Primary Examiner—John R. Lee
Assistant Examiner—Bernard E. Souw
(74) Attorney, Agent, or Firm—Rabin & Berdo, P.C.

(57) ABSTRACT

An optical fiber light-transmissive structure especially suitable for decorative objects and capable of displaying splendid light effects, is formed by rolling process applied at any appropriate position of an optical fiber cord, so as to produce sophisticated changes at refracting planes at an interior of the optical fiber cord. Using the structure according to the invention, light beams entering into an input end of the optical fiber cord are able to show dazzling light effects at a light-emitting segment formed, thereby achieving results such as increasing a light-emitting area thereof, providing flexible arrangement of the light-emitting segment, and displaying artistic and lively light effects.

3 Claims, 4 Drawing Sheets

OPTICAL FIBER HAVING A LIGHT-EMITTING SEGMENT

BACKGROUND OF THE INVENTION (a) Field of the Invention

The invention relates to an optical fiber having a light-emitting segment, and more particularly, to an optical fiber having a light-emitting segment having a long and thin shape, wherein light beams inputted into an end thereof are transmitted in an almost total reflection manner to the other end thereof with minimal attenuation. The optical fiber having a light-emitting segment according to the invention is suitable for applications of decorative purposes such as optical fiber bouquets, Christmas tree lights and wings of angel dolls.

(b) Description of the Prior Art

Large numbers of optical fiber cords are generally used in optical fiber applications for decorative purposes. One end (usually an input end) of the optical fiber cords is bundled, and cords of individual optical fibers may then be stretched, gathered or arranged, or lengthened or shortened based upon styles or designs of decorative objects to be applied in order to construct appropriate shapes and patterns desired. The bundled end of the optical fiber cords is secured to a device having a dynamic light-emitting mechanism comprising a light bulb, a color plate and a motor. When the light-emitting device is activated, light beams from the light bulb are passed through the transparent color plate, which rotates at a low speed and is also divided into regions of different colors and stripes. Next, the constantly changing and multicolor light beams produced are entered into the input ends of the optical fiber bundle, and are displayed as dynamic and exuberant colors via ends of the optical fibers to form multiple brilliant light spots distributed around the decorative objects.

However, in a prior optical fiber cord, due to characteristics of optical fibers, only one small light spot having a size equal to a sectional area of a certain optical fiber can be formed at an end of the optical fiber cord, and thus presentation of colors is somewhat limited. To attain large areas of light spots, it is necessary to substantially increase the quantity of the optical fibers. Not only production cost thereof is greatly increased, but also complications caused by arranging and securing large numbers of optical fibers are relatively elevated. Furthermore, shiny effects of conventional optical fiber cords are exhibited exclusively at ends of the cords in a form of light spots, and hence application flexibilities of glittering effects of the optical fibers are restrained. It shall be noted that designs of decorative objects using optical fibers are frequently accommodated according to structural characteristics of optical fibers instead of being able to be freely and independently developed. As a result, some industrialists have tried to process middle portions of optical fiber cords by either cutting or bending in order to change light-transmissive structures of the optical fibers, and light spots are indeed shown at the cut or bent portions. Yet, the optical fibers having been cut or bent are also damaged to a large extent with respect to the structures thereof. Therefore, the cut and bent optical fibers are often difficult to assemble or to use, and are rather non-endurable by being easily fractured at the cut or bent portions.

SUMMARY OF THE INVENTION

In the view of the above, the object of the invention is to provide an optical fiber light-transmissive structure capable of overcoming the aforesaid drawbacks namely limited light spots effects of prior optical fibers, and display instability (fractures and damages) apart from tips of prior optical fiber cords. The optical fiber light-transmissive structure in accordance with the invention has undamaged optical fiber structure strength, and also offers arrangement flexibilities of light-emitting segments thereof, thereby enormously increasing a light-emitting area therein as well as bringing splendid light effects.

DETAILED DESCRIPTION OF THE PREFERRED EMBODIMENTS

To better understand the structural characteristics and uses of the invention, detailed descriptions shall be given with the accompanying drawings hereunder.

Figure 1:
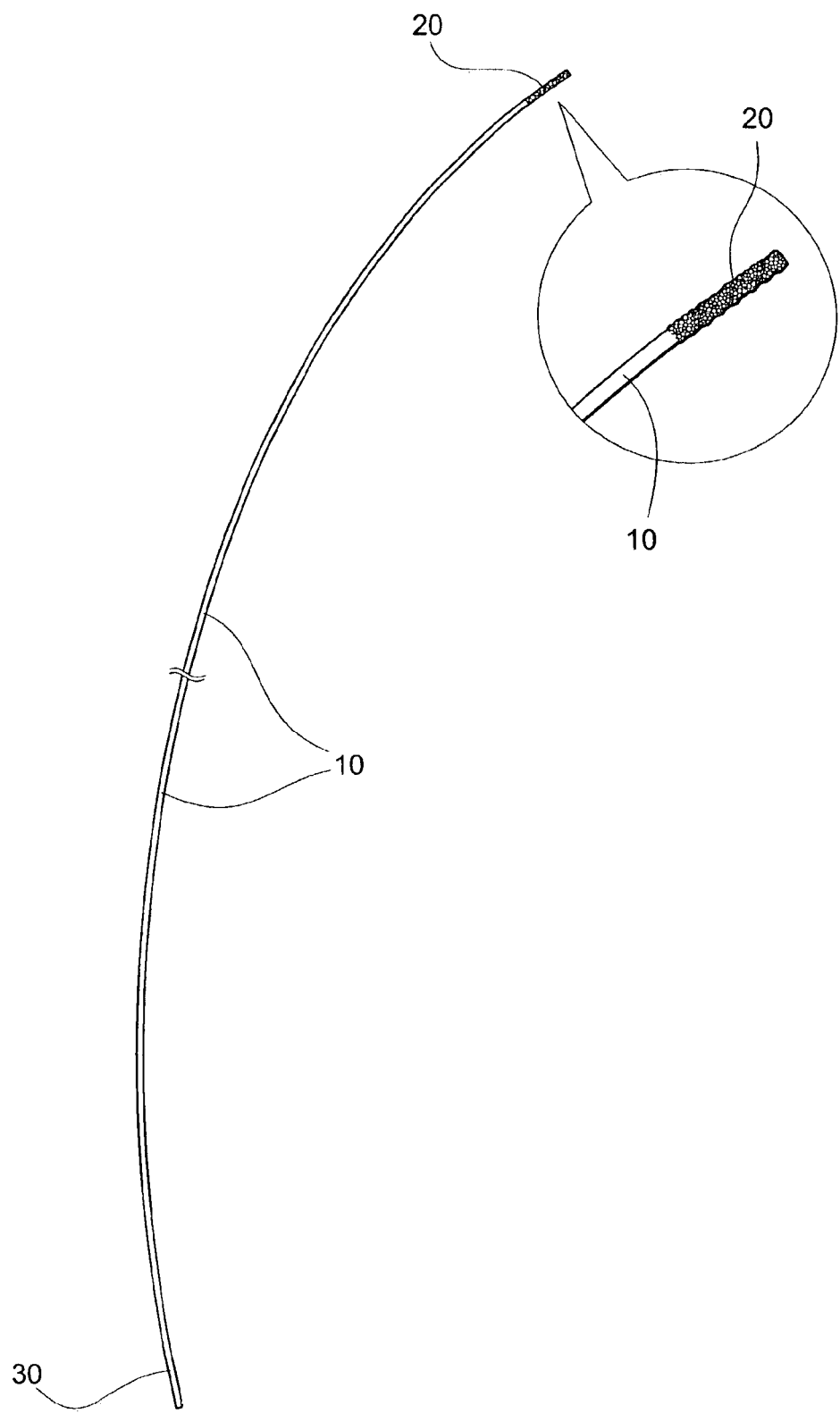
FIG. 1 shows a structural schematic view illustrating a light-emitting segment disposed at an end of an optical fiber cord according to the invention.
Figure 2:
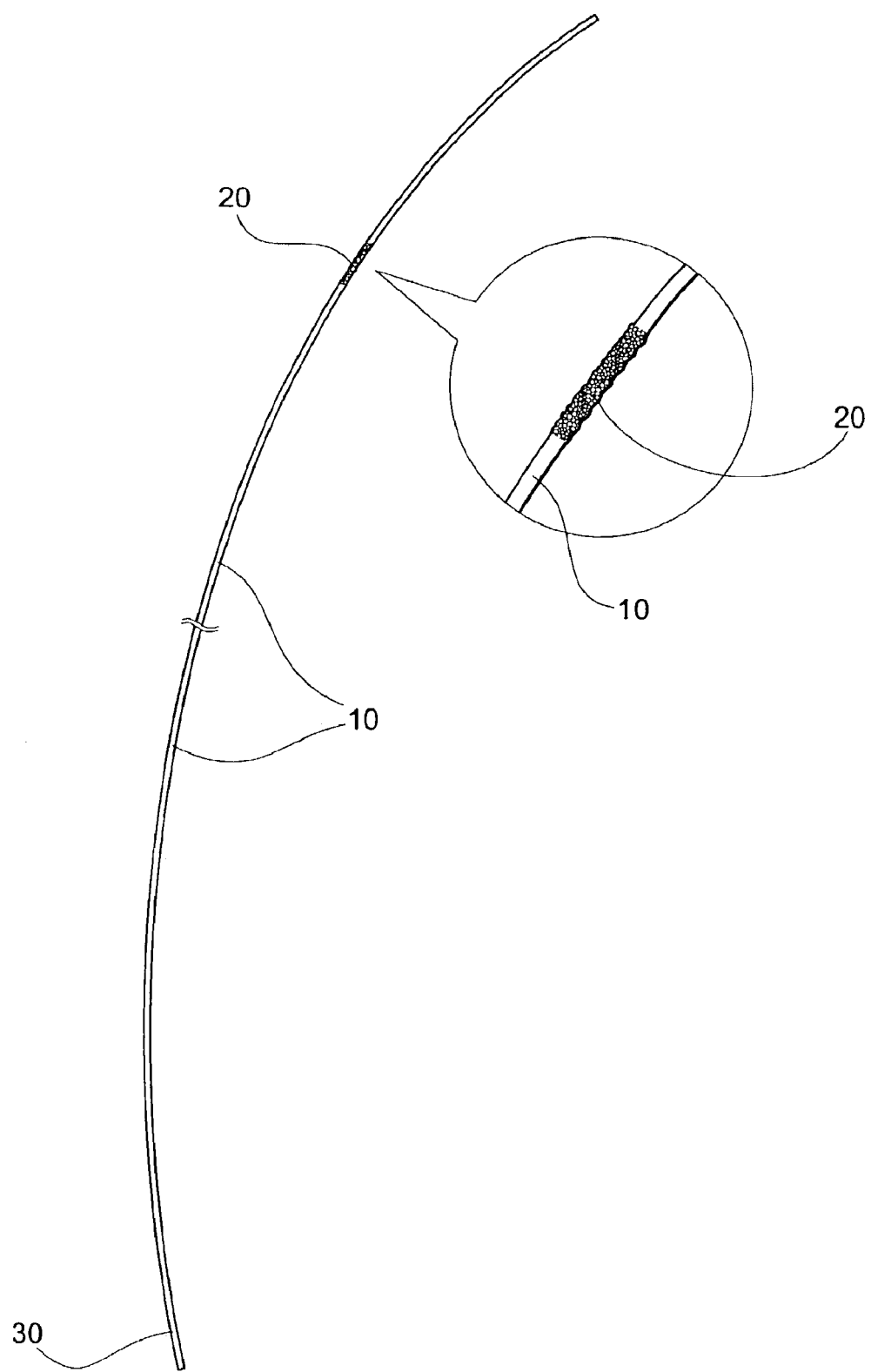
FIG. 2 shows a structural schematic view illustrating a light-emitting segment disposed at a middle portion of an optical fiber cord according to the invention.

Referring to FIGS. 1 and 2, according to the invention, an optical fiber cord 10 is processed by rolling an appropriate portion thereof, so as to form a light-emitting segment 20 having a roughened surface as compared to the surface of the remainder of the optical fiber cord, at the processed portion. First of all, without damaging the structure of the optical fiber cord 10 and yet retaining an original strength thereof, sophisticated changes are caused at internal refracting planes of the light-emitting 20 after the rolling process. Secondly, a refracting section of the light-emitting segment 20 displays an appropriate circular segment (a preferable length is between 10 to 15 mm after repeated experiments) instead of a prototypic small area of the prior light spot. Consequently, the light-emitting area thereof is advanced to a gorgeous "light segment" from the conventional light spots, and light-emitting effects are naturally much superior to those of the prior art. Thirdly, the structure of the light-emitting segment 20 may be freely disposed at any position at the optical fiber cord 10, since the structure of the light-emitting segment 20 is a non-destructive structure, thereby elevating application flexibilities of the invention.

Figure 3:
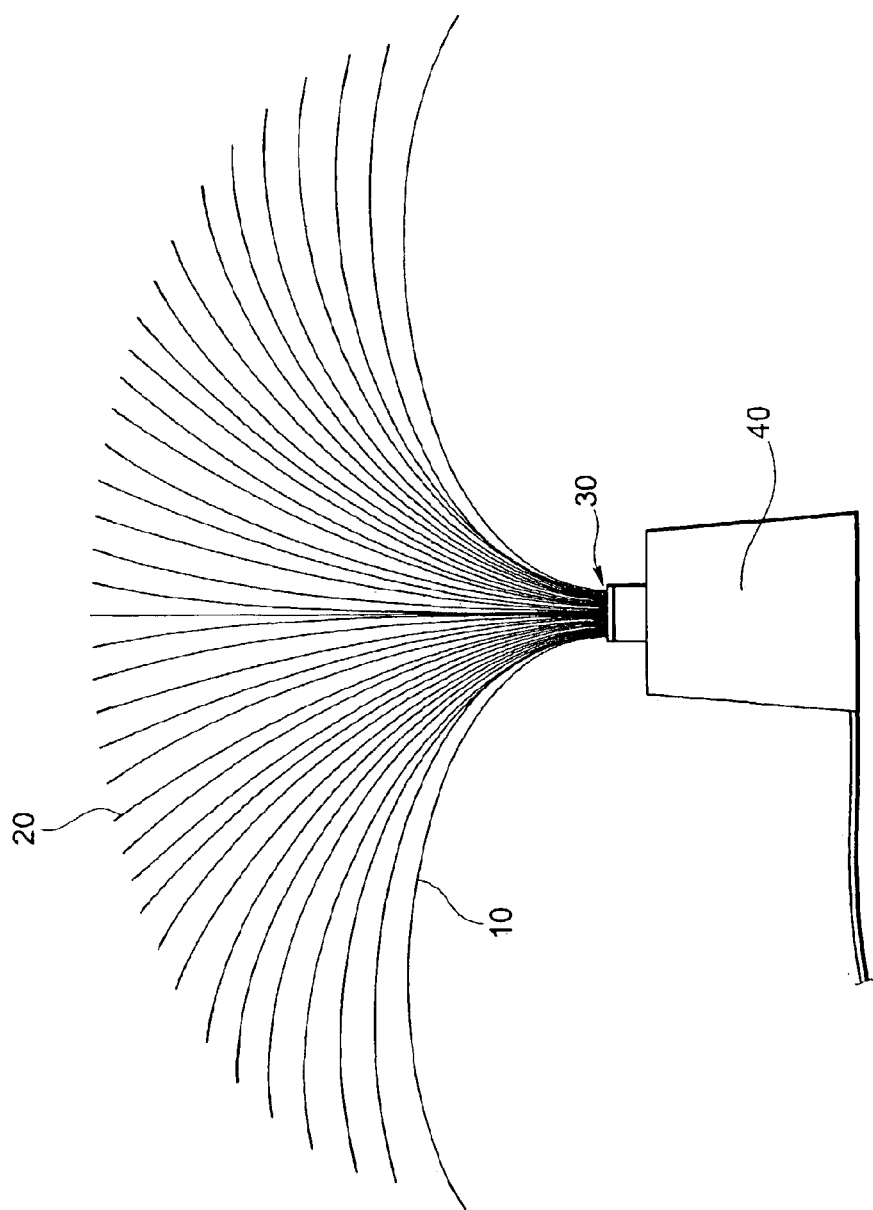
FIG. 3 shows an embodiment according to the invention being applied as an optical fiber bouquet.
Figure 4:
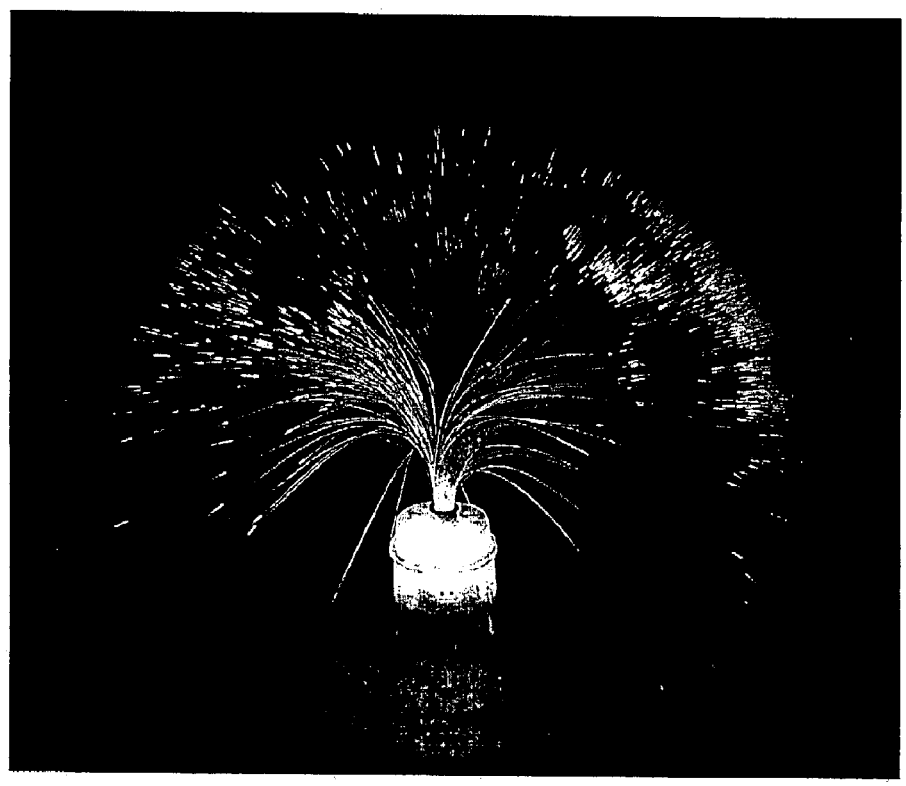
FIG. 4 is an actual photograph showing splendid light-transmissive effects in dark surroundings according to the invention.

Referring to FIG. 3, input ends 30 of a plurality of the optical fiber cords 10 according to the invention are bundled, and are secured to a dynamic light-emitting device 40. When the light-emitting device 40 is activated, multicolor and constantly changing light beams enter into the input ends 30, and are then transmitted to the light-emitting segments 20 of the individual optical fiber cords 10, thereby clearly displaying dashing "light segments". The bright light effects produced and areas distributed by the "light segments" are far more outstanding than those of conventional optical fibers. Moreover, owing to flexibility characteristics of the light-emitting segments 20, the invention is especially suitable for decorative objects made of optical fibers and having dazzling and subtle designs for enhancing esthetical values and texture thereof. Referring to FIG. 4, particularly in dark surroundings, the bright light effects displayed as "light segments" are indeed magnificently brilliant, and are thus excellent for building an elegant atmosphere.

Conclusive from the above, in accordance with the invention, for that larger light-emitting areas are achieved while also maintaining structural strength of optical fiber cords, the lightness displayed by the optical fiber light-transmissive structure is distinct from that of the prior art, thereby more flexibly exhibiting splendid light effects by the light segments.

It is of course to be understood that the embodiment described herein is merely illustrative of the principles of the invention and that a wide variety of modifications thereto may be effected by persons skilled in the art without departing from the spirit and scope of the invention as set forth in the following claims.

What is claimed is:

1. An optical fiber structure, comprising:

a light emitting device; and a plurality of optical fibers, each optical fiber having an input end, said optical fibers being bundled together at their respective input ends, with the respective input ends being positioned in a region of the light emitting device, each input end receiving light emitted from the light emitting device, and each optical fiber transmitting the received light through an interior thereof, each optical fiber further having a light emitting segment that has an outer surface that is roughened relative to an outer surface of a remainder of the optical fiber, each light emitting segment emitting the light, through its roughened outer surface, that is transmitted through the interior of the optical fiber.

2. An optical fiber, comprising:

an input end that is adapted to receive light emitted from a light emitting device, and a light emitting segment that has a roughened outer surface relative to an outer surface of a remainder of the optical fiber, said optical fiber transmitting the received light through an interior thereof, and emitting the transmitted light through the roughened surface of the light emitting segment.

3. The optical fiber recited in claim 2, wherein the light emitting segment is disposed in an intermediate position along a length of the optical fiber.

* * * * *